(12) United States Patent
Kato

(10) Patent No.: US 8,497,618 B2
(45) Date of Patent: Jul. 30, 2013

(54) STATOR FOR ROTATRY ELECTRICAL MACHINE INCLUDING AN INSULATING BOBBIN

(75) Inventor: Isao Kato, Toyoake (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 208 days.

(21) Appl. No.: 13/044,105

(22) Filed: Mar. 9, 2011

(65) Prior Publication Data
US 2011/0234031 A1 Sep. 29, 2011

(30) Foreign Application Priority Data

Mar. 26, 2010 (JP) ................................. 2010-071895

(51) Int. Cl.
*H02K 3/34* (2006.01)
*H02K 11/00* (2006.01)

(52) U.S. Cl.
USPC .............................. 310/215; 310/71; 310/194

(58) Field of Classification Search
USPC ..................... 310/71, 193, 214, 215, 194, 414
See application file for complete search history.

(56) References Cited

U.S. PATENT DOCUMENTS

| | | | |
|---|---|---|---|
| 5,625,276 A * | 4/1997 | Scott et al. ....................... | 322/24 |
| 6,281,609 B1 * | 8/2001 | Itami et al. ................... | 310/68 B |
| 7,026,739 B2 * | 4/2006 | Okada et al. ................... | 310/194 |
| 7,560,839 B2 * | 7/2009 | Sumiya et al. .................. | 310/71 |
| 7,626,303 B2 * | 12/2009 | Watanabe et al. ...... | 310/216.095 |
| 7,649,295 B2 * | 1/2010 | Fukui et al. .................... | 310/215 |
| 2008/0106161 A1 * | 5/2008 | Matsuzaki et al. .............. | 310/71 |

FOREIGN PATENT DOCUMENTS

| | | | |
|---|---|---|---|
| JP | 2008278704 A | * | 11/2008 |
| JP | 2009-261094 A | | 11/2009 |

OTHER PUBLICATIONS

Machine Translation, JP 2008278704 A, Nov. 13, 2008.*
Dictionary.com, Definition of term "bore", Nov. 26, 2012.*

* cited by examiner

*Primary Examiner* — Tran Nguyen
*Assistant Examiner* — Thomas Truong
(74) *Attorney, Agent, or Firm* — Buchanan Ingersoll & Rooney PC

(57) ABSTRACT

A stator for a rotary electrical machine, includes a stator core in a cylinder shape and having plural magnetic pole teeth, which are arranged in a circumferential direction of the stator while keeping a distance therebetween and each of which protrudes in a radial direction of the stator core, a coil configured with a conductive wire wound around each of the magnetic pole teeth, an insulating bobbin provided between the coil and the corresponding magnetic pole tooth, and an electric power supply portion arranged axially outwardly of the stator core, electrically connecting the coil with an outside of the stator, and including an outgoing wire, which corresponds to a portion of at least one of a winding start and a winding end of the conductive wire being extended by a predetermined length, and an isolating member having a groove portion for accommodating and guiding the corresponding outgoing wire.

15 Claims, 8 Drawing Sheets

STATOR FOR ROTATRY ELECTRICAL MACHINE INCLUDING AN INSULATING BOBBIN

CROSS REFERENCE TO RELATED APPLICATIONS

This application is based on and claims priority under 35 U.S.C. §119 to Japanese Patent Application 2010-071895, filed on Mar. 26, 2010, the entire content of which is incorporated herein by reference.

TECHNICAL FIELD

This disclosure generally relates to a stator for a rotary electrical machine such as an electric motor, an electricity generator and the like. More specifically, this disclosure pertains to a configuration of a power supply portion supplying an electric power to a stator coil.

BACKGROUND DISCUSSION

Generally, a rotary electrical machine such as a generator motor and the like mounted on a hybrid vehicle, an electric vehicle and the like is configured so as to have a revolving-field type inner rotor so that a stator having a coil is arranged at an outer circumferential side and a rotor having a magnet is arranged radially inwardly of the stator. The stator of the rotary electric machine having the above-configuration generally includes a cylinder-shaped stator core having plural magnetic pole teeth, each of which protrudes in a radially inward direction, the coil, which is configured in a manner where a conductive wire is wound on each magnetic pole tooth, and an insulating bobbin, which is formed in a cylindrical shape and which is provided between each coil and each magnetic pole tooth so as to serve as an electric insulation. Furthermore, for example, disclosed in JP2009-261094A is a power collection/distribution structure of a rotary electric machine that is configured so that a bus ring, which is a ring-shaped conductor, is arranged axially outward of the stator core so that an electric power is supplied to each coil via the bus ring.

The power collection/distribution structure of the rotary electric machine disclosed in JP2009-261094A includes a number of bus rings corresponding to a number of plural phases for connecting coils having the corresponding phases, and plural holding members holding and fixing thereat predetermined portions of the bus rings in a circumferential direction thereof. Each of the holding members is formed in the same (identical) shape. According to the disclosure in JP2009-261094A, a number of components and costs relating to the configuration of the power collection/distribution structure may be reduced, so that a complicated work in a manufacturing process may be avoided. As a result, a productivity of the rotary electric machine may be increased.

Not only in the power collection/distribution structure of the rotary electric machine disclosed in JP2009-261094A, but also in general, a number of bus rings corresponding to a number of phases are provided at the rotary electric machine. Furthermore, plural holding portions are provided at the rotary electric machine in order to avoid each bus rings from contacting with each other. Still further, because an electric power is supplied to the rotary electric machine by means of a power cable, a terminal board for carrying the electric power needs to be provided at the rotary electric machine. Moreover, in order to connect the terminal board and the bus rings, bus bars need to be provided at the rotary electric machine. The bus bars are also arranged so as not to contact with each other. Additionally, in order to connect coil ends (winding ends) of the coils of different phases so as to form a neutral point, a ring-shaped neutral point bus ring may be adapted to the rotary electric machine. End portions of winding starts (coil starts) and the winding ends (the coil ends) of each phase coil are connected to predetermined portions of the corresponding bus ring by means of welding, screwing or the like.

Although the electric power is suppliable to each coil of the corresponding phase by using the corresponding bus ring, the bus bars and the like, a bus member tends to be expensive. Usually, the bus rings, the bus bars and the like are made of a copper wire, a copper plate and the like, which are relatively expensive. Furthermore, a bending process, a stamping process and the like and then, an insulation coating process need to be applied to the bus rings, the bus bars and the like. Still further, a number of components used for supporting the bus members such as the holding members and the like in order to ensure the electric insulation tends to increase, which may result in complicating an assembly operation. Additionally, a number of connecting points at which each end portion of each coil is connected tends to increase, which may also result in complicating a connecting operation. As described above, a relatively great number of components are used for the power supply portion in addition to the bus rings and the bus bars. Therefore, a relatively great number of manufacturing hours is necessary to manufacture the rotary electric machine.

Furthermore, a predetermined insulation distance (space) and a creepage insulation distance need to be formed in order to ensure an electrical insulation performance between each phase and between each ground. Accordingly, a size and a shape of each of the holding members and the like may not be flexibly changed, and an assembly of the rotary electric machine is strictly determined. Therefore, a size of the power supply portion in an axial direction tends to increase, which may further result in increasing a size of the stator.

A need thus exists for a stator for a rotary electrical machine which is not susceptible to the drawback mentioned above.

SUMMARY

According to an aspect of this disclosure, a stator for a rotary electrical machine, includes a stator core formed in a cylinder shape and having a plurality of magnetic pole teeth, which are arranged in a circumferential direction of the stator while keeping a distance between the neighboring magnetic pole teeth and each of which protrudes in a radial direction of the stator core, a coil configured with a conductive wire wound around each of the magnetic pole teeth, an insulating bobbin formed in a cylinder shape and provided between the coil and the corresponding magnetic pole tooth, and an electric power supply portion arranged axially outwardly of the stator core, electrically connecting the coil with an outside of the stator, and including an outgoing wire, which corresponds to a portion of at least one of a winding start and a winding end of the conductive wire wound around the coil being preliminarily extended by a predetermined length, and an isolating member, at which a groove portion for accommodating and guiding the corresponding outgoing wire is formed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First embodiment

Figure 1B:
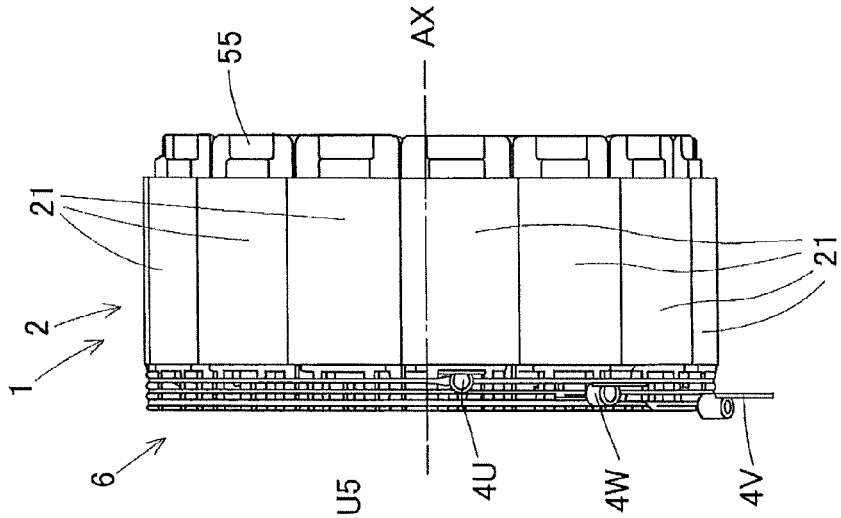
FIG. 1B is a side view illustrating the stator of the rotary electrical machine according to the first embodiment.
Figure 1A:
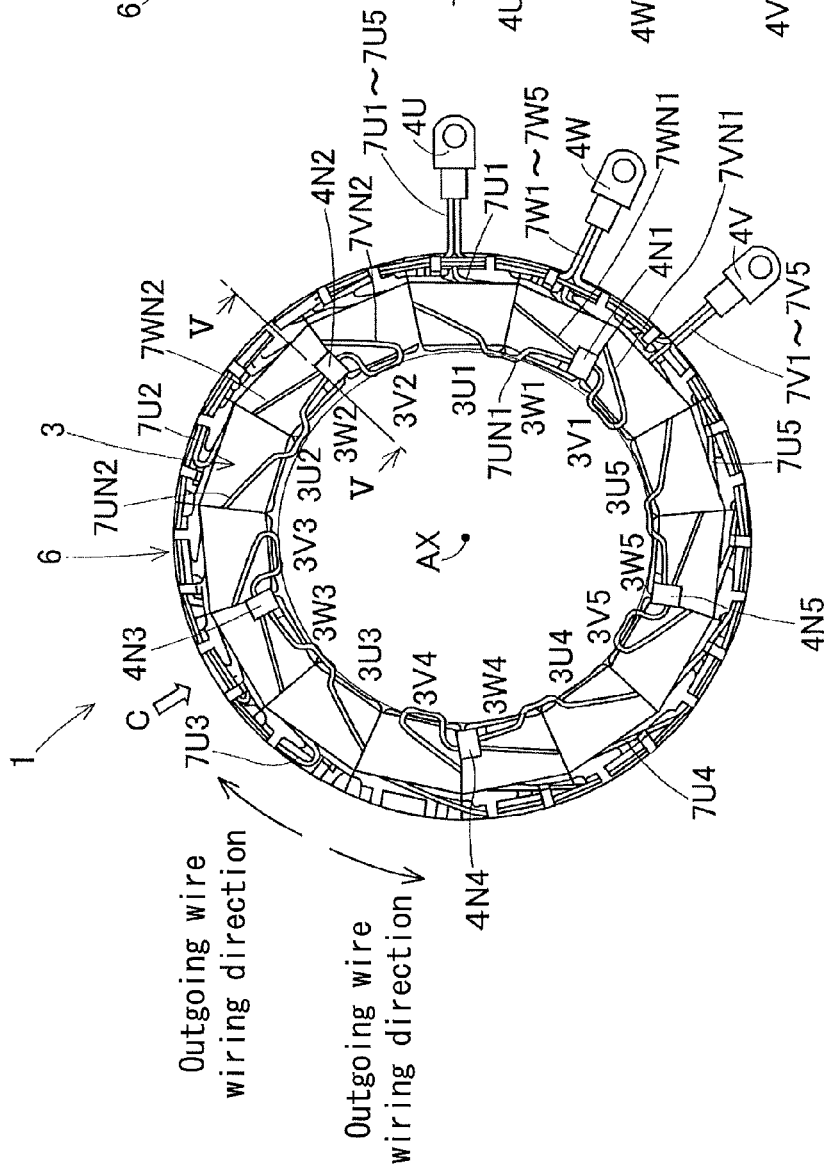
FIG. 1A is a plane view illustrating a stator of a rotary electrical machine according to a first embodiment when being viewed in an axial extending direction.

A stator 1 of a rotary electrical machine according to a first embodiment will be described below with reference to FIGS. 1 to 6 of the attached drawings. Illustrated in FIGS. 1A and 1B are diagrams for explaining the stator 1 of the rotary electrical machine according to the first embodiment. More specifically, illustrated in FIG. 1A is a plane view of the stator 1 of the rotary electrical machine according to the first embodiment when being viewed in an extending direction of an axis line AX. Illustrated in FIG. 1B is a side view of the stator 1 of the rotary electrical machine according to the first embodiment. The rotary electrical machine is configured so that the stator 1 is arranged at an outer circumferential portion of the rotary electrical machine and a rotor is arranged radially inwardly of the stator 1. Furthermore, the rotary electrical machine is configured so as to be substantially symmetrical relative to the axis line AX. As illustrated in FIG. 1, the stator 1 includes a stator core 2 and a coil 3 (coils 3). Additionally, the stator 1 includes an electric power supply portion 6 arranged axially outwardly of the stator core 2, in other words, at a left side of the stator core 2 in the side view of FIG. 1B.

Figure 2:
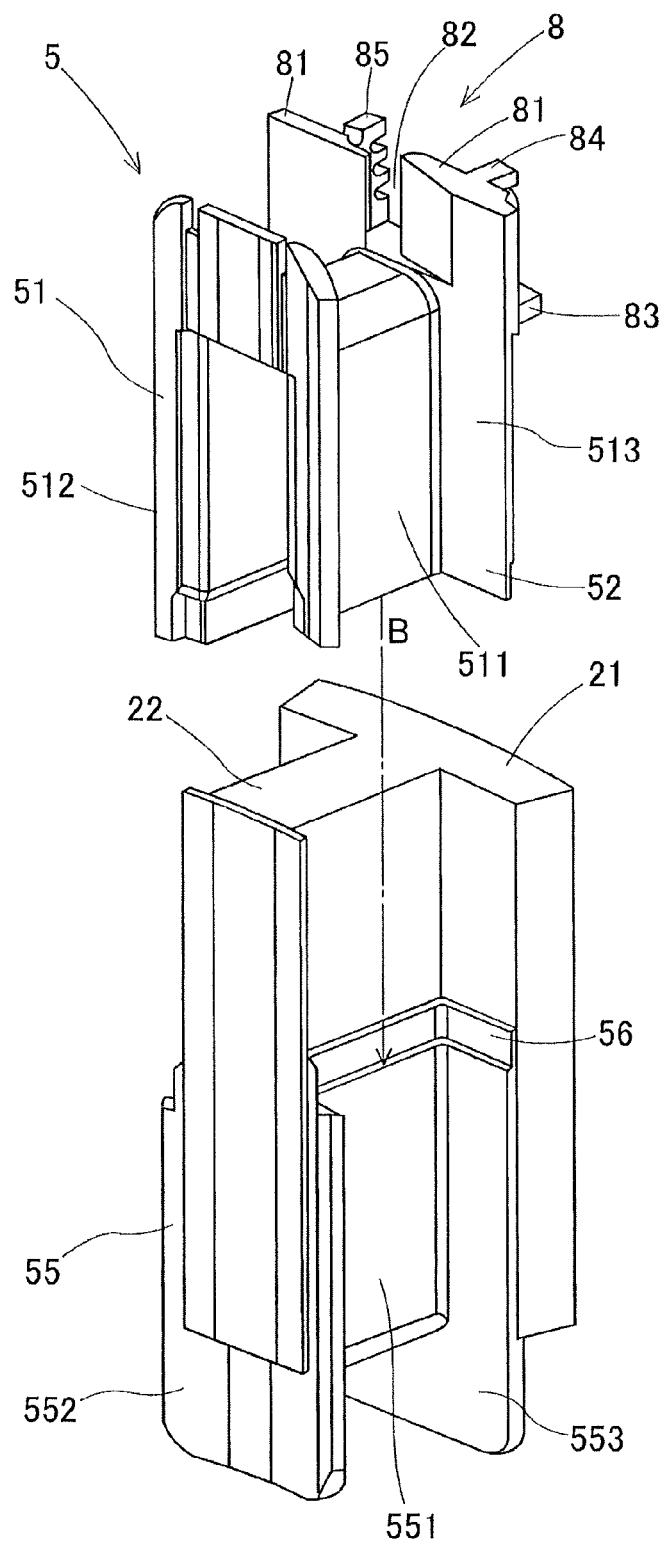
FIG. 2 is a perspective view for explaining one divided core and an insulating bobbin according to the first embodiment.

The stator core 2 is configured so that divided cores 21 (in this embodiment, a core is equally divided into 15 cores) are arranged in a circumferential direction of the stator core 2 so as to form a cylindrical shape. Illustrated in FIG. 2 is a perspective view for explaining one of the divided cores 21 and an insulating bobbin 5. Each of the divided cores 21 is formed so that substantially T-shaped magnetic steel plates are assembled in an up-and-down direction in FIG. 2 so as to extend in the up-and-down direction. Each of the divided cores 21 includes a magnetic pole tooth 22, which protrudes in a radially inward direction.

Figure 3:
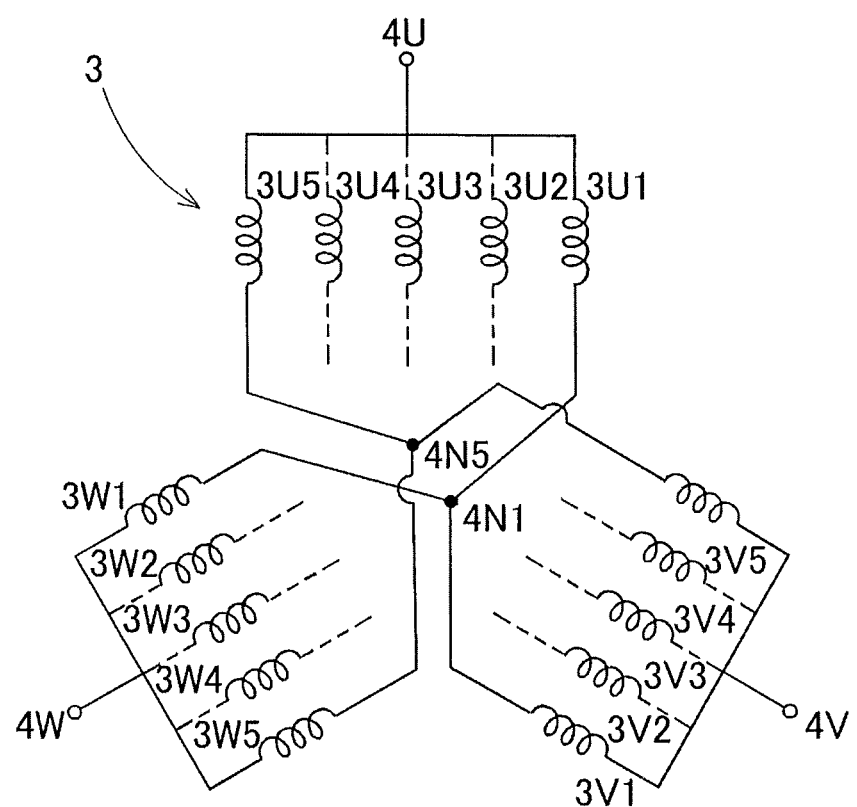
FIG. 3 is a diagram illustrating a connection of three sets of five coils, each set forms a different phase from each other, according to the first embodiment.

The coil 3 is configured in a manner where a conductive wire is wound around the magnetic pole tooth 22 of each divided core 21. Three sets of five coils, each set of five coils forms a different phase from other two sets of five coils, in other words, fifteen coils in total are arranged in the following order in a counterclockwise direction as illustrated in FIG. 1A: a first V-phase coil 3V1, a first W-phase coil 3W1, a first U-phase coil 3U1, a second V-phase coil 3V2, a second W-phase coil 3W2, a second U-phase coil 3U2, a third V-phase coil 3V3, a third W-phase coil 3W3, a third U-phase coil 3U3, a fourth V-phase coil 3V4, a fourth W-phase coil 3W4, a fourth U-phase coil 3U4, a fifth V-phase coil 3V5, a fifth W-phase coil 3W5 and a fifth U-phase coil 3U5. Illustrated in FIG. 3 is a diagram illustrating a connection of the three sets of five coils, each set of five coils forms the different phase from other two sets of five coils. As illustrated in FIG. 3, a set of five coils of the U-phase, i.e. the first U-phase coil 3U1, the second U-phase coil 3U2, the third U-phase coil 3U3, the fourth U-phase coil 3U4 and the fifth U-phase coil 3U5 are arranged in parallel with each other. The set of five coils of the V-phase, i.e. the first V-phase coil 3V1, the second V-phase coil 3V2, the third V-phase coil 3V3, the fourth V-phase coil 3V4 and the fifth V-phase coil 3V5 are arranged in parallel with each other. Similarly, the set of five coils of the W-phase, i.e. the first W-phase coil 3W1, the second W-phase coil 3W2, the third W-phase coil 3W3, the fourth W-phase coil 3W4 and the fifth W-phase coil 3W5 are arranged in parallel with each other. The three phases (the U-phase, the V-phase and the W-phase) form a star connection (a Y-connection). Supply ends of the respective five coils 3U1, 3U2, 3U3, 3U4 and 3U5 of the U-phase are bundled and connected to a U-phase terminal 4U. Supply ends of the respective five coils 3V1, 3V2, 3V3, 3V4 and 3V5 of the V-phase are bundled and connected to a V-phase terminal 4V. Similarly, supply ends of the respective five coils 3W1, 3W2, 3W3, 3W4 and 3W5 of the W-phase are bundled and connected to a W-phase terminal 4W. Additionally, a neutral terminal of each of the first U-phase coil 3U1, the first V-phase coil 3V1 and the first W-phase coil 3W1 is connected to a first connecting member 4N1, which serves as a neutral point. Similarly, a neutral terminal of each of the second U-phase coil 3U2, the second V-phase coil 3V2 and the second W-phase coil 3W2 is connected to a second connecting member 4N2, which serves as a neutral point. Furthermore, a neutral terminal of each of the third U-phase coil 3U3, the third V-phase coil 3V3 and the third W-phase coil 3W3 is connected to a third connecting member 4N3, which serves as a neutral point. A neutral terminal of each of the fourth U-phase coil 3U4, the fourth V-phase coil 3V4 and the fourth W-phase coil 3W4 is connected to a fourth connecting member 4N4, which serves as a neutral point. Still further, a neutral terminal of each of the fifth U-phase coil 3U5, the fifth V-phase coil 3V5 and the fifth W-phase coil 3W5 is connected to a fifth connecting member 4N5, which also serves as a neutral point. The connections formed by the first and fifth connecting members 4N1 and 4N5 are illustrated and the rest of the connections formed by the second, third and fourth connecting members 4N2, 4N3 and 4N4 are omitted in FIG. 3.

The insulating bobbin 5 is provided between each coil 3 and each magnetic pole tooth 22. As illustrated in FIG. 2, each of the insulating bobbins 5 includes an upper bobbin 51 and a lower bobbin 55. The upper bobbin 51 includes a cylinder portion 511, which is formed so as to cover an approximately upper half of the corresponding magnetic pole tooth 22, an inner flange portion 512, which is formed so as to extend from a radially inner circumferential end portion of the cylinder portion 511 and in a circumferential direction of the rotary electrical machine, and an outer flange portion 513, which is formed so as to extend from a radially outer circumferential end portion of the cylinder portion 511 and in the circumferential direction. Lower portions of the cylinder portion 511, the inner flange portion 512 and the outer flange portion 513 in FIG. 2 are formed so that a thickness thereof is approximately half a thickness of upper portions of the cylinder portion 511, the inner flange portion 512 and the outer flange portion 513, respectively, so that the lower portions of the cylinder portion 511, the inner flange portion 512 and the outer flange portion 513 serve as an upper fitting portion 52. Similarly, the lower bobbin 55 includes a cylinder portion 551, which is formed so as to cover an approximately lower half of the corresponding magnetic pole tooth 22, an inner flange portion 552, which is formed so as to extend in the circumferential direction from a radially inner side surface of the cylinder portion 551, and an outer flange portion 553, which is formed so as to extend in the circumferential direction from a radially outer side surface of the cylinder portion 551. Upper portions of the cylinder portion 551, the inner flange portion 552 and the outer flange portion 553 are formed so that thickness thereof are approximately half a thickness of lower portions of the cylinder portion 551, the inner flange portion 552 and the outer flange portion 553, respectively, so that the upper portions of the cylinder portion 551, the inner flange portion 552 and the outer flange portion 553 form a lower fitting portion 56.

When the upper bobbin 51 is downwardly moved in a direction indicated by an arrow B in FIG. 2 relative to the lower bobbin 55, the upper fitting portion 52 of the upper bobbin 51 overlaps with the lower fitting portion 56 of the lower bobbin 55, thereby fittingly attaching the upper bobbin 51 at the lower bobbin 55. The insulating bobbin 5 forms a cylindrical portion as a result of attachment of the upper bobbin 51 at the lower bobbin 55. The insulating bobbin 5 serves as a winding form when the conductive wire is wound in order to form the coil 3, and as an electric insulation between each coil 3 and each magnetic pole tooth 22.

The electric power supply portion 6 is arranged at a position axially outwardly of the stator core 2. The electric power supply portion 6 electrically connects each coil 3 with an outside of the stator 1. Furthermore, the electric power supply portion 6 includes outgoing wires, each of which is a portion of the conductive wire configuring the corresponding coil 3 extending therefrom by a predetermined length, and an electric power supply isolating portion 8, at which a groove portion for accommodating and guiding the outgoing wire is formed. Additionally, the electric power supply isolating portion 8 serves as an isolating member.

Each of the outgoing wires configuring the electric power supply portion 6 is a portion of a wire, which is ensured by elongating the supply end of a winding start of the conductive wire configuring each coil 3 by a predetermined length. As illustrated in FIG. 1A, a first U-phase outgoing wire 7U1 of the first U-phase coil 3U1 is guided in a radially outward direction from the first U-phase coil 3U1 and further, the first U-phase outgoing wire 7U1 is guided in the radially outward direction so as to extend towards the outside of the electric power supply portion 6. A second U-phase outgoing wire 7U2 of the second U-phase coil 3U2 is guided in the radially outward direction from the second U-phase coil 3U2. Then, the second U-phase outgoing wire 7U2 is bent in a U-shape so as to be guided along an outer circumference of the electric power supply portion 6 in a clockwise direction in FIG. 1A. Furthermore, the second U-phase outgoing wire 7U2 meets the first U-phase outgoing wire 7U1 at an outer circumference of the first U-phase coil 3U1. Then, the second U-phase outgoing wire 7U2 is guided in the radially outward direction in parallel with the first U-phase outgoing wire 7U1 so as to extend outwardly of the electric power supply portion 6. Similarly, a third U-phase outgoing wire 7U3 of the third U-phase coil 3U3 is guided in the radially outward direction from the third U-phase coil 3U3. Then, the third U-phase outgoing wire 7U3 is bent in a U-shape and then is further guided along the outer circumference of the electric power supply portion 6 in the clockwise direction in FIG. 1A. Furthermore, the third U-phase outgoing wire 7U3 meets the first U-phase outgoing wire 7U1 and the second U-phase outgoing wire 7U2 at the outer circumference of the first U-phase coil 3U1. Then, the third U-phase outgoing wire 7U3 is guided in the radially outward direction in parallel with the first U-phase outgoing wire 7U1 and the second U-phase outgoing wire 7U2 so as to extend to the outside of the electric power supply portion 6.

On the other hand, a fourth U-phase outgoing wire 7U4 of the fourth U-phase coil 3U4 and a fifth U-phase outgoing wire 7U5 of the fifth U-phase coil 3U5 are guided in the radially outward direction from the fourth U-phase coil 3U4 and the fifth U-phase coil 3U5, respectively. Then, the fourth U-phase outgoing wire 7U4 and the fifth U-phase outgoing wire 7U5 are smoothly curved and are guided along the outer circumference of the electric power supply portion 6 in a reverse direction, i.e. in the counterclockwise direction in FIG. 1A. Furthermore, the fourth U-phase outgoing wire 7U4 and the fifth U-phase outgoing wire 7U5 meet the first U-phase outgoing wire 7U1, the second U-phase outgoing wire 7U2 and the third U-phase outgoing wire 7U3 at the outer circumference of the first U-phase coil 3U1. Then, the fourth U-phase outgoing wire 7U4 and the fifth U-phase outgoing wire 7U5 are guided in the radially outward direction in parallel with the first U-phase outgoing wire 7U1, the second U-phase outgoing wire 7U2 and the third U-phase outgoing wire 7U3 so as to extend to the outside of the electric power supply portion 6. Accordingly, the first U-phase outgoing wire 7U1, the second U-phase outgoing wire 7U2, the third U-phase outgoing wire 7U3, the fourth U-phase outgoing wire 7U4 and the fifth U-phase outgoing wire 7U5 meet each other at the outer circumference of the first U-phase coil 3U1. Then, the first U-phase outgoing wire 7U1, the second U-phase outgoing wire 7U2, the third U-phase outgoing wire 7U3, the fourth U-phase outgoing wire 7U4 and the fifth U-phase outgoing wire 7U5 are guided in the radially outward direction in parallel with each other so as to extend to the outside of the electric power supply portion 6. Furthermore, end portions of the respective first U-phase outgoing wire 7U1, the second U-phase outgoing wire 7U2, the third U-phase outgoing wire 7U3, the fourth U-phase outgoing wire 7U4 and the fifth U-phase outgoing wire 7U5 are bundled by means of the U-phase terminal 4U and are press-fittingly joined.

The V-phase is configured in a similar manner as in the U-phase. More specifically, a first V-phase outgoing wire 7V1 of the first V-phase coil 3V1 is guided in the radially outward direction from the first V-phase coil 3V1. Then, the first V-phase outgoing wire 7V1 is further guided in the radially outward direction so as to extend to the outside of the electric power supply portion 6. A second V-phase outgoing wire 7V2 of the second V-phase coil 3V2 and a third V-phase outgoing wire 7V3 of the third V-phase coil 3V3 are guided in the clockwise direction. On the other hand, a fourth V-phase outgoing wire 7V4 of the fourth V-phase coil 3V4 and a fifth V-phase outgoing wire 7V5 of the fifth V-phase coil 5V3 are guided in a reverse direction, i.e. in the counterclockwise direction in FIG. 1A. The first V-phase outgoing wire 7V1, the second V-phase outgoing wire 7V2, the third V-phase outgoing wire 7V3, the fourth V-phase outgoing wire 7V4 and the fifth V-phase outgoing wire 7V5 meet with each other at an outer circumference of the first V-phase coil 3V1. Then, the first V-phase outgoing wire 7V1, the second V-phase outgoing wire 7V2, the third V-phase outgoing wire 7V3, the fourth V-phase outgoing wire 7V4 and the fifth V-phase outgoing wire 7V5 are guided in the radially outward direction in parallel with each other so as to extend to the outside of the electric power supply portion 6. End portions of the respective first V-phase outgoing wire 7V1, the second V-phase outgoing wire 7V2, the third V-phase outgoing wire 7V3, the fourth V-phase outgoing wire 7V4 and the fifth V-phase outgoing wire 7V5 are bundled by means of the V-phase terminal 4V and are press-fittingly joined.

The W-phase is configured in a similar manner as in the U-phase. More specifically, a first W-phase outgoing wire 7W1 of the first W-phase coil 3W1 is guided in the radially outward direction from the first W-phase coil 3W1. Then, the first W-phase outgoing wire 7W1 is further guided in the radially outward direction so as to extend to the outside of the electric power supply portion 6. A second W-phase outgoing wire 7W2 of the second W-phase coil 3W2 and a third W-phase outgoing wire 7W3 of the third W-phase coil 3W3 are wired in the clockwise direction. On the other hand, a fourth W-phase outgoing wire 7W4 of the fourth W-phase coil 3W4 and a fifth W-phase outgoing wire 7W5 of the fifth W-phase coil 3W5 are wired in a reverse direction, i.e. in the counterclockwise direction in FIG. 1A. The first W-phase outgoing wire 7W1, the second W-phase outgoing wire 7W2, the third W-phase outgoing wire 7W3, the fourth W-phase outgoing wire 7W4 and the fifth W-phase outgoing wire 7W5 meet with each other at an outer circumference of the first W-phase coil 3W1. End portions of the respective first W-phase outgoing wire 7W1, the second W-phase outgoing wire 7W2, the third W-phase outgoing wire 7W3, the fourth W-phase outgoing wire 7W4 and the fifth W-phase outgoing wire 7W5 are bundled by means of the W-phase terminal 4W and are press-fittingly joined.

Each of the U-phase terminal 4U, the V-phase terminal 4V and the W-phase terminal 4W is connected to a terminal board, so that the outgoing wires (7U1, 7U2, 7U3, 7U4, 7U5, 7V1, 7V2, 7V3, 7V4, 7V5, 7W1, 7W2, 7W3, 7W4, 7W5) are connectable to the outside of the stator 1 via the terminal board via the corresponding terminals 4U, 4V and 4W. Therefore, in a case where a motor is adapted as the rotary electrical machine, the electric power is suppliable to each of the coils 3U1, 3U2, 3U3, 3U4, 3U5, the V-phase coils 3V1, 3V2, 3V3, 3V4, 3V5 and the W-phase coils 3W1, 3W2, 3W3, 3W4, 3W5 via a power cable, which is connected to the terminal board and which is configured so as to supply the electric power therethrough. On the other hand, in a case where a generator is adapted as the rotary electrical machine, the electric power may be extracted from each of the U-phase coils 3U1, 3U2, 3U3, 3U4, 3U5, the V-phase coils 3V1, 3V2, 3V3, 3V4, 3V5 and the W-phase coils 3W1, 3W2, 3W3, 3W4 and 3W5 via a power cable, which is connected to the terminal board and which is configured so as to extract the electric power therethrough.

As illustrated in FIG. 1A, a winding end of the conductive line configuring the first U-phase coil 3U1 serves as a first U-phase neutral terminal portion 7UN1, which is arranged so as to extend above the first W-phase coil 3W1. A winding end of the conductive wire configuring the first V-phase coil 3V1 and a winding end of the conductive wire configuring the first W-phase coil 3W1 serve as a first V-phase neutral terminal portion 7VN1 and a first W-phase neutral terminal portion 7WN1, respectively. Furthermore, both of the first V-phase neutral terminal portion 7VN1 and the first W-phase neutral terminal portion 7WN1 are arranged so as to extend above the first W-phase coil 3W1. End portions of the first U-phase neutral terminal portion 7UN1, the first V-phase neutral terminal portion 7VN1 and the first W-phase neutral terminal portion 7WN1 are bundled at the first connecting member 4N1 and are press-fittingly joined.

As illustrated in FIG. 2, each electric power supply isolating portion 8 configuring the electric power supply portion 6 is formed integrally with the corresponding insulating bobbin 5. More specifically, the electric power supply isolating portion 8 is integrally formed at a portion of the outer flange portion 513 of the corresponding upper bobbin 51 extending in the axially outward direction from the corresponding divided core 21. Therefore, fifteen electric power supply isolating portions 8 are provided at the stator 1 so as to correspond to the number of divided cores 21 and the coils 3 provided at the stator 1.

Figure 4:
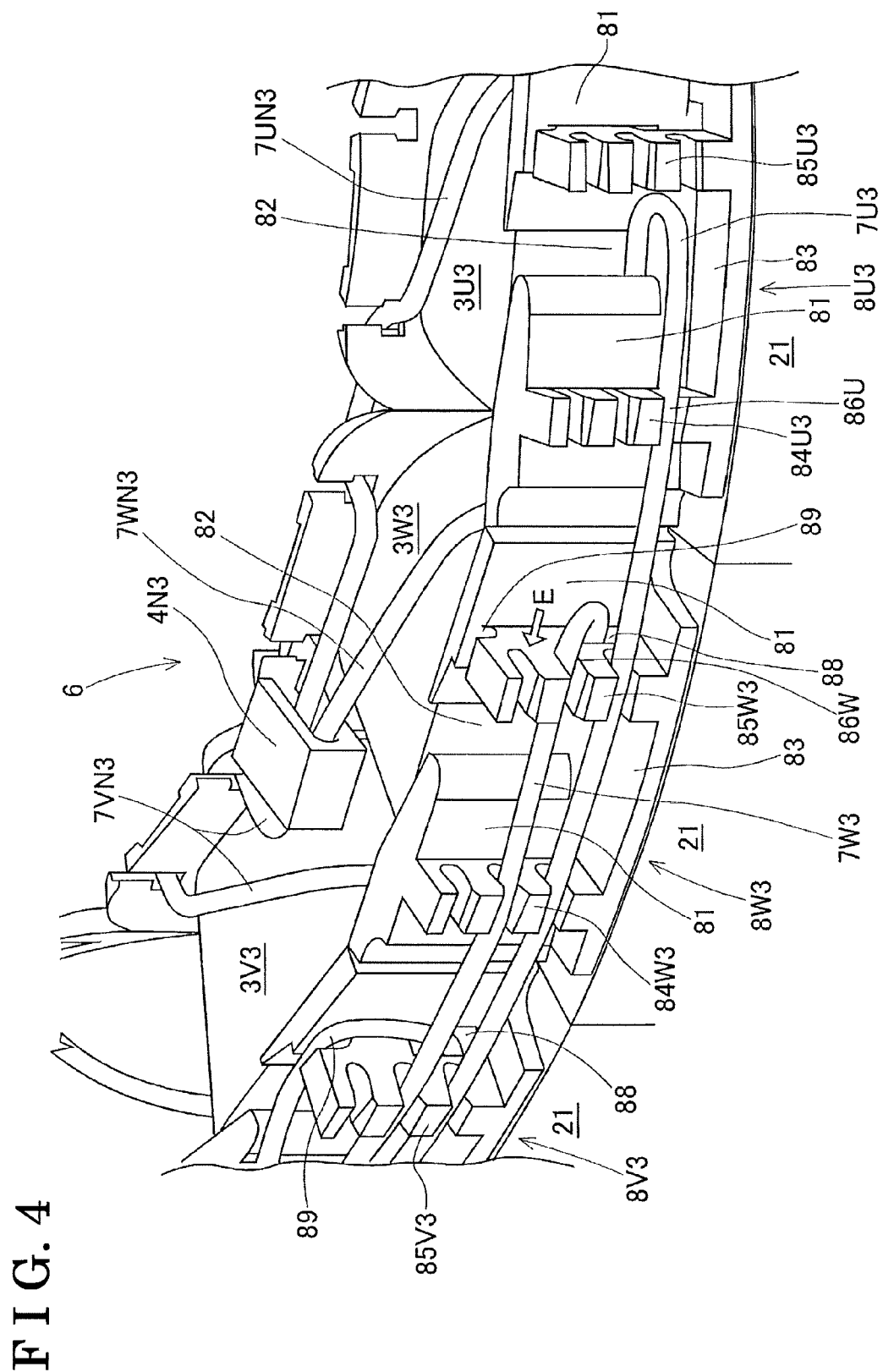
FIG. 4 is a perspective view illustrating a power supply portion when being viewed in a direction indicated by an arrow C in FIG. 1A.
Figure 5:
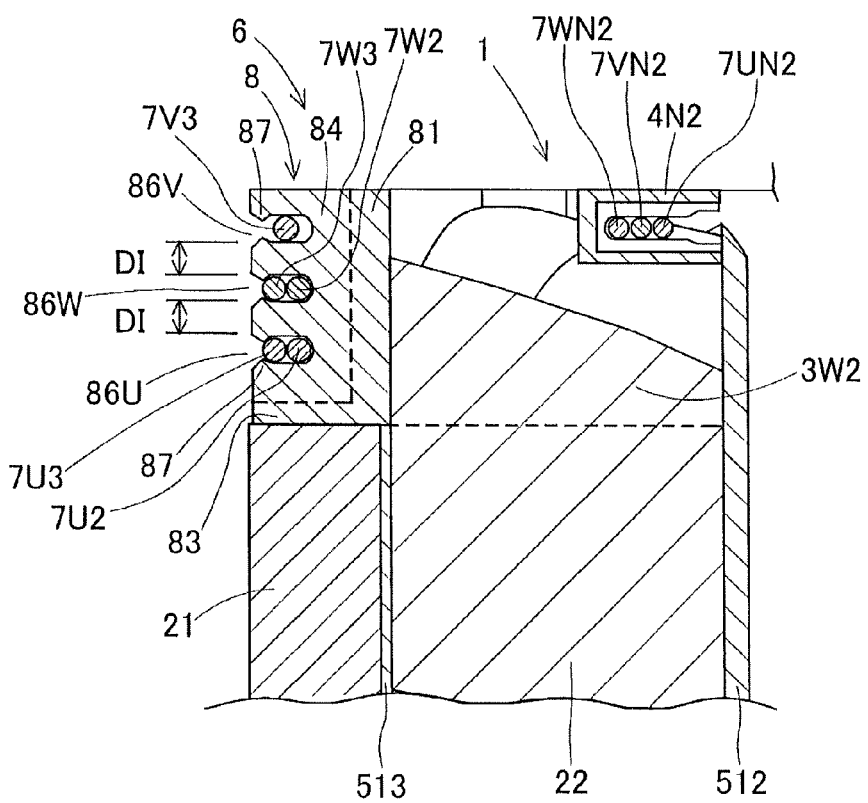
FIG. 5 is a partial cross-sectional diagram illustrating the stator taken along line V-V in FIG. 1A.

The electric power supply portion 6 will be described in more detail with reference to FIGS. 4 and 5. Illustrated in FIG. 4 is a perspective view of the electric power supply portion 6 when being viewed in a direction indicated by an arrow C in FIG. 1A. Illustrated in FIG. 5 is a partial cross-sectional diagram of the stator 1 taken along line V-V in FIG. 1A. As illustrated in FIG. 4, the electric power supply isolating portions 8, which include U-phase electric power supply isolating portions 8U3, V-phase electric power supply isolating portions 8V3 and W-phase electric power supply isolating portions 8W3, are arranged axially outwardly of the corresponding divided cores 21, so that the electric power supply isolating portions 8 are arranged to form an annular shape. As illustrated in FIG. 2, each of the electric power supply isolating portions 8 includes a bobbin extending portion 81, which is formed in a plate shape, a plate-shaped core contacting portion 83, and first and second groove forming base portions 84 and 85. The bobbin extending portion 81 is formed so as to extend from the outer flange portion 513 of the upper bobbin 51 and so as to extend in the axis line AX direction and in the circumferential direction. The core contacting portion 83 is formed so as to extend in the radially outward direction from the bobbin extending portion 81 and so as to contact an axially end surface of the corresponding divided core 21. The first and second groove forming base portions 84 and 85 are formed so as to be orthogonal to the bobbin extending portion 81 and the core contacting portion 83.

Figure 7:
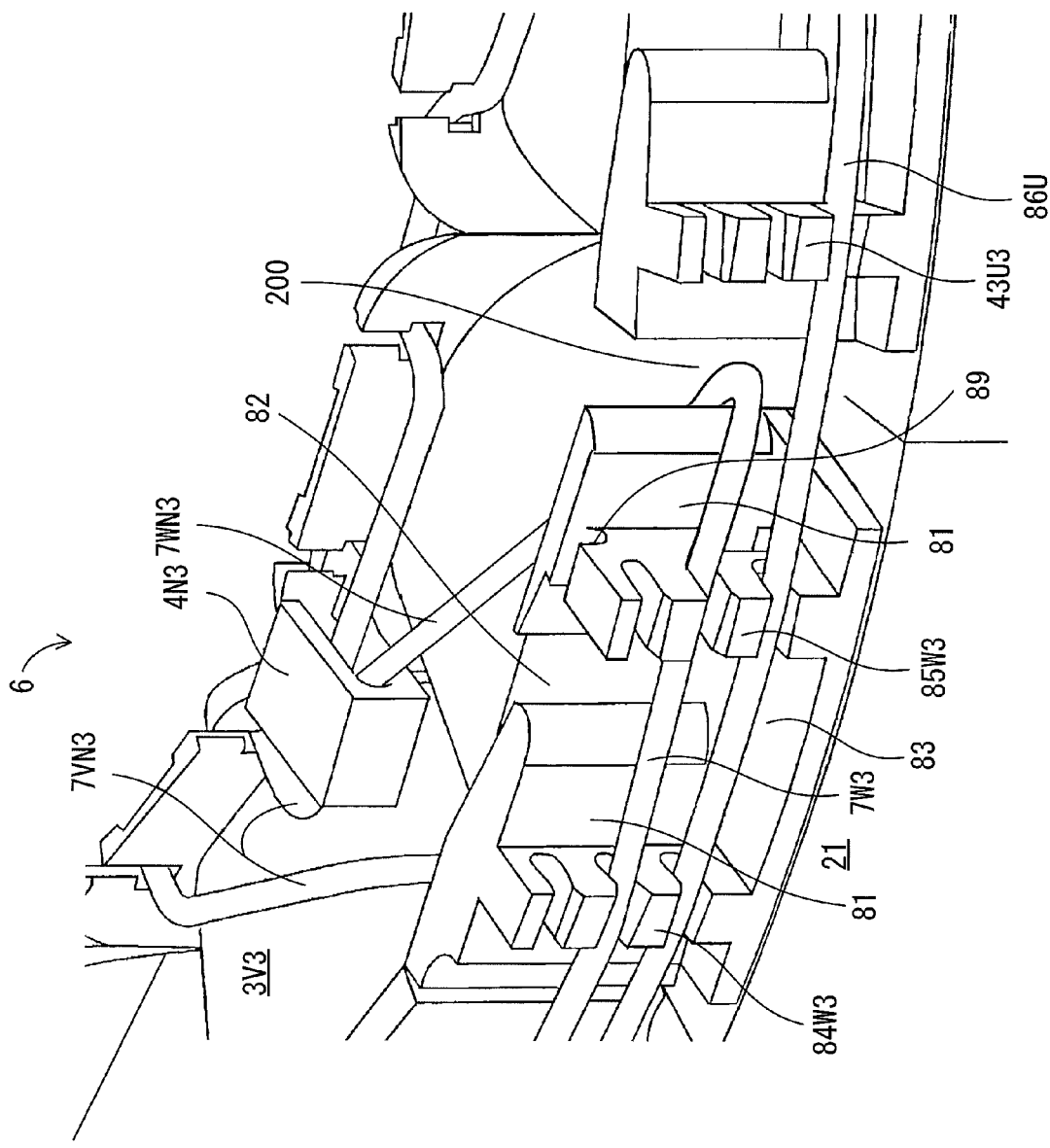
FIG. 7 is a perspective view illustrating a modified example of the power supply portion when being viewed in the direction indicated by the arrow C in FIG. 1A.
Figure 8:
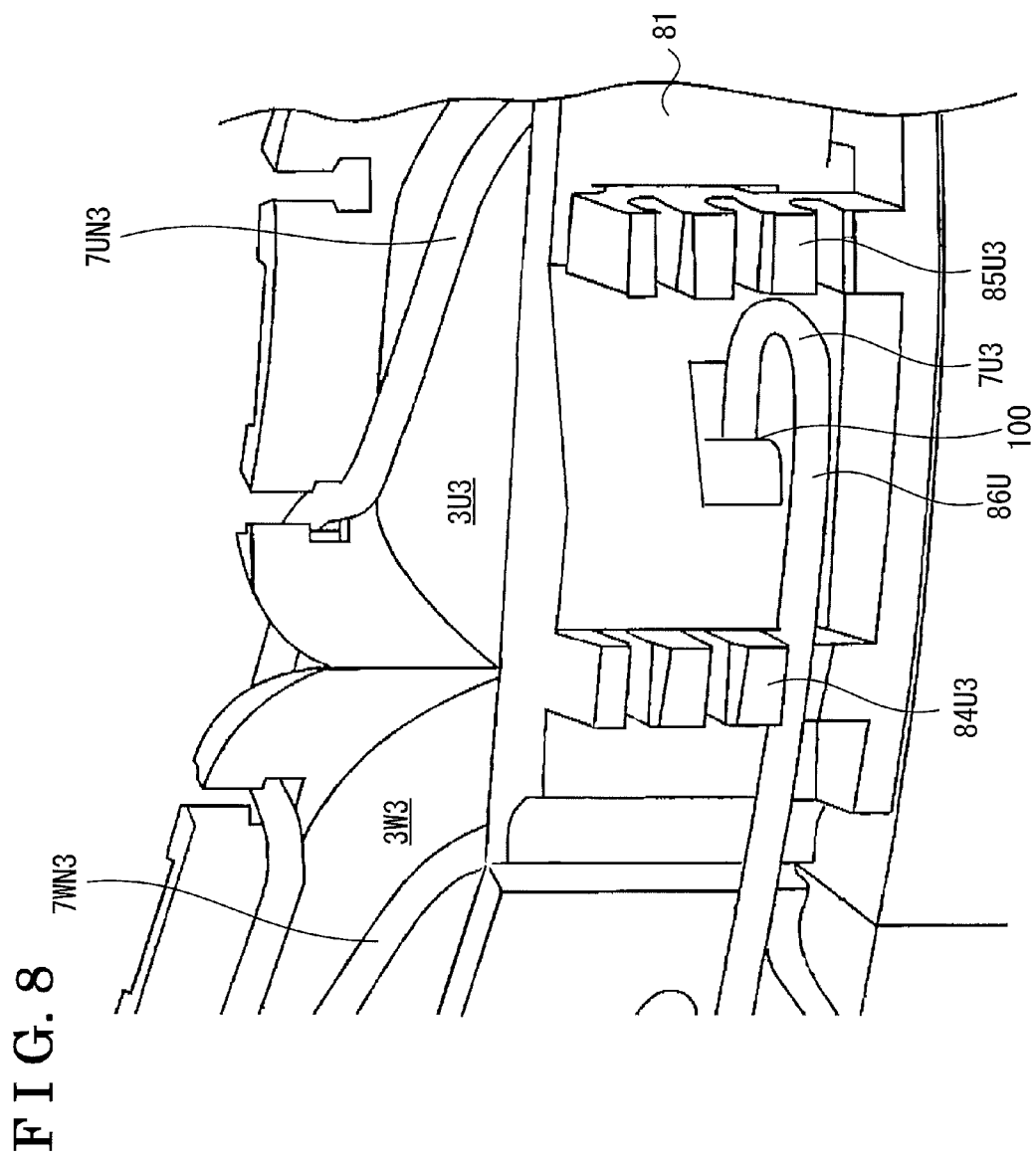
FIG. 8 is a perspective view illustrating another modified example of the power supply portion when being viewed in the direction indicated by the arrow C in FIG. 1A.

As illustrated in FIG. 4, a guiding groove portion 82, which inclines in the radial direction, is formed at an approximately intermediate portion of the bobbin extending portion 81 of each of the power supply isolating portions 8U3, 8V3 and 8W3 in the circumferential direction. The guiding groove portion 82 is formed to have enough width for guiding the corresponding outgoing wire. The bobbin extending portion 81 is divided into two pieces by the guiding groove portion 82. The first and second groove forming base portions 84 and 85 (which include first and second U-phase groove forming base portions 84U3 and 85U3, first and second V-phase groove forming base portions 84V3 and 85V3, and first and second W-phase groove forming base portions 84W3 and 85W3) are formed at the respective pieces of the bobbin extending portion 81 so as to protrude therefrom. Additionally, the guiding groove portion 82 may be formed as a guiding hole portion through which the corresponding outgoing wire penetrates and is guided. Alternatively, plural electric power supply isolating portions 8 may be arranged so as to ensure a clearance 100 between the neighboring electric power supply isolating portions 8 in the circumferential direction, so that the outgoing wires are guided through the corresponding clearances (see FIG. 7). Still further, a guiding bore 200 may be formed at each of the electric power supply isolating portions 8 instead of forming a groove so as to divide the bobbin extending portion 81 into two pieces (see FIG. 8).

A V-phase groove portion 86V, a W-phase groove portion 86W and a U-phase groove portion 86U are formed at a radially outer surface of each of the first and second groove forming base portions 84W3, 84U3, 84V3, 85W3, 85U3 and 85V3 while keeping a distance from each other and so as to extend in parallel with each other in the radially inward direction (see FIG. 5). The U-phase groove portion 86U, the V-phase groove portion 86V and the W-phase groove portion 86W are formed at the same positions between the first and second groove forming portion 84 and 85 of each single electric power supply isolating portion 8, so that the outgoing wires, each of which forms the different phase and each of which is accommodated at the corresponding groove portion, are wired to be in parallel with each other. As illustrated in FIG. 5, each of the U-phase groove portion 86U, the V-phase groove portion 86V and the W-phase groove portion 86W is formed to have enough depth to accommodate therein two outgoing wires. Furthermore, each of the U-phase groove portion 86U, the V-phase groove portion 86V and the W-phase groove portion 86W includes a protruding portion 87, so that an opening end (a groove entrance) of each of the U-phase groove portion 86U, the V-phase groove portion 86V and the W-phase groove portion 86W in the axial direction is narrowed when comparing to other portions of each of the U-phase groove portion 86U, the V-phase groove portion 86V and the W-phase groove portion 86W in the axial direction. Still further, a distance DI between the neighboring V-phase groove portion 86V and the W-phase groove portion 86W and a distance DI between the neighboring W-phase groove portion 86W and the U-phase groove portion 86U are formed to have enough distances for ensuring an electrical insulation performance.

Figure 6:
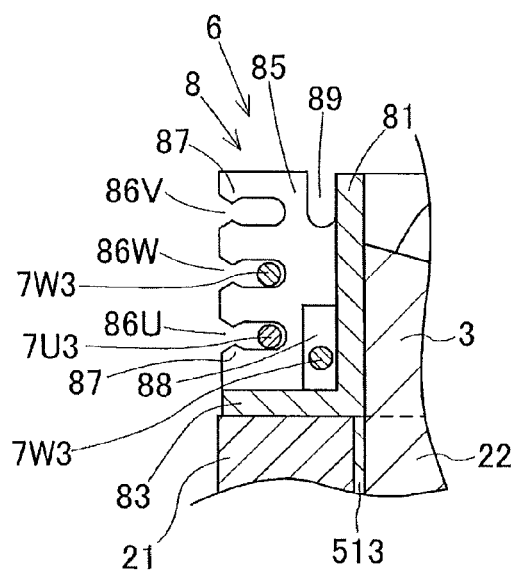
FIG. 6 is a partially enlarged diagram illustrating the power supply portion when being viewed in a direction indicated by an arrow E in FIG. 4.

A bore 88 and a groove 89 (see FIG. 6) are formed at each of the second U-phase groove forming base portion 85U3, the second V-phase groove forming base portion 85V3 and the second W-phase groove forming base portion 85W3, which are arranged at the right of the first U-phase groove forming base portion 84U3, the first V-phase groove forming base portion 84V3 and the first W-phase groove forming base portion 84W3, respectively, in FIG. 4. Illustrated in FIG. 6 is a partially enlarged diagram of the electric power supply portion 6 when being viewed in a direction indicated by an arrow E in FIG. 4. The bore 88 is a rectangular-shaped bore, which is formed at a portion where the groove forming base portion 85 contacts the bobbin extending portion 81 and the core contacting portion 83. The groove 89 is formed at a portion where the groove forming base portion 85 contacts the bobbin extending portion 81. Each of the bore 88 and the groove 89 is formed to have enough width for the outgoing wire to pass through in order to form a curve.

A wiring of the outgoing wire will be described below. As illustrated in FIG. 4, the third U-phase outgoing wire 7U3 of the third U-phase coil 3U3 is guided in the radially outward direction from the third U-phase coil 3U3. Then, the third U-phase outgoing wire 7U3 passes through the guiding groove portion 82 of the U-phase electric power supply isolating portion 8U3. The third U-phase outgoing wire 7U3 is bent (curved) in a substantially U-shape at above the core contacting portion 83. Then, the third U-phase outgoing wire 7U3 is guided to the U-phase groove portion 86U of the first U-phase groove forming base portion 84U3. The third U-phase outgoing wire 7U3 is then sequentially accommodated within the U-phase groove portions 86U formed at the respective electric power supply isolating portions 8, so that the third U-phase outgoing wire 7U3 is guided (extends) in the circumferential direction.

The third W-phase outgoing wire 7W3 of the third W-phase coil 3W3 is guided in the radially outward direction from the third W-phase coil 3W3. Then, the third W-phase outgoing wire 7W3 passes through the guiding groove portion 82 of the W-phase electric power supply isolating portion 8W3 and then, passes through the bore 88 formed at the second W-phase groove forming base portion 85W3 so as to curve in a substantially U-shape. The third W-phase outgoing wire 7W3 is then guided to the W-phase groove portion 86W of the first W-phase groove forming base portion 84W3. Accordingly, as illustrated in FIG. 6, the third W-phase outgoing wire 7W3 is accommodated within the W-phase groove portion 86W. The third W-phase outgoing wire 7W3 is then sequentially accommodated within the W-phase groove portions 86W formed at the respective electric power supply isolating portions 8, so that the third W-phase outgoing wire 7W3 is guided (extends) in the circumferential direction. Additionally, a state where the third U-phase outgoing wire 7U3 is guided so as to be accommodated within the U-phase groove portion 86U is also illustrated in FIG. 6.

The third V-phase outgoing wire 7V3 of the third W-phase coil 3V3 is guided in the radially outward direction from the third V-phase coil 3V3. Then, the third V-phase outgoing wire 7V3 passes through the guiding groove portion 82 of the W-phase electric power supply isolating portion 8W3, the bore 88 formed at the second V-phase groove forming base portion 85V3, and then the groove 89 so as to curve in a substantially U-shape. Then, the third V-phase outgoing wire 7V3 is guided to the V-phase groove portion 86V of the groove forming base portion. Subsequently, the third V-phase outgoing wire 7W3 is sequentially accommodated within the V-phase groove portions 86V of the respective electric power supply isolating portions 82, which are arranged in the annular shape, so that the third V-phase outgoing wire 7W3 is guided in the circumferential direction. As described above, the third U-phase outgoing wire 7U3, the third V-phase outgoing wire 7V3 and the third W-phase outgoing wire 7W3 are wired while ensuring an insulation distance (an electrical clearance) between the third U-phase outgoing wire 7U3, the third V-phase outgoing wire 7V3 and the third W-phase outgoing wire 7W3, and from different phase coils (i.e. between the third U-phase outgoing wire 7U3 on the one hand and the V-phase coils and the W-phase coils on the other hand, between the third V-phase outgoing wire 7V3 on the one hand and the U-phase coils and the W-phase coils on the other hand, and between the third W-phase outgoing wire 7W3 on the one hand and the U-phase coils and the V-phase coils on the other hand) by using the guiding groove portions 82, the bores 88 and the grooves 89.

Each of the second U-phase outgoing wire 7U2 of the second U-phase coil 3U2, the second V-phase outgoing wire 7V2 of the second V-phase coil 3V2 and the second W-phase outgoing wire 7W2 of the second W-phase coil 3W2 is wired in a similar manner as described above. Each of the first U-phase outgoing wire 7U1 of the first U-phase coil 3U1, the first V-phase outgoing wire 7V1 of the first V-phase coil 3V1 and the first W-phase outgoing wire 7W1 of the first W-phase coil 3W1 is guided in the radially outward direction from each of the first U-phase coil 3U1, the first V-phase coil 3V1 and the first W-phase coil 3W1. However, the first U-phase outgoing wire 7U1, the first V-phase outgoing wire 7V1 and the first W-phase outgoing wire 7W1 are not accommodated within the U-phase groove portion 86U, the V-phase groove portion 86V and the W-phase groove portion 86W, respectively. Instead, the first U-phase outgoing wire 7U1, the first V-phase outgoing wire 7V1 and the first W-phase outgoing wire 7W1 are guided in the radially outward direction towards the U-phase coil terminal 4U, the V-phase coil terminal 4V and the W-phase coil terminal 4W, respectively. On the other hand, the fourth U-phase outgoing wire 7U4 of the fourth U-phase coil 3U4, the fourth V-phase outgoing wire 7U4 of the fourth V-phase coil 3V4 and the fourth W-phase outgoing wire 7W4 of the fourth W-phase coil 3W4 are wired in a direction reverse to a wiring direction in FIG. 4. Similarly, the fifth U-phase outgoing wire 7U5 of the fifth U-phase coil 3U5, the fifth V-phase outgoing wire 7V5 of the fifth V-phase coil 3V5 and the fifth W-phase outgoing wire 7W5 of the fifth W-phase coil 3W5 are wired in the direction reverse to the wiring direction in FIG. 4. Therefore, the fourth U-phase outgoing wire 7U4, the fourth V-phase outgoing wire 7V4, the fourth W-phase outgoing wire 7W4, the fifth U-phase outgoing wire 7U5, the fifth V-phase outgoing wire 7V5 and the fifth W-phase outgoing wire 7W5 do not need to be bent (curved) in the U-shape. Instead, the fourth U-phase outgoing wire 7U4, the fourth V-phase outgoing wire 7V4, the fourth W-phase outgoing wire 7W4, the fifth U-phase outgoing wire 7U5, the fifth V-phase outgoing wire 7V5 and the fifth W-phase outgoing wire 7W5 are loosely curved and guided to the corresponding phase groove portions (i.e. the groove portions 86U, 86V and 86W).

As illustrated in FIG. 4, a third U-phase neutral terminal portion 7UN3 of the third U-phase coil 3U3 extends above the third U-phase coil 3U3 in FIG. 4. The third U-phase neutral terminal portion 7UN3 once extends in the radially inward direction, then, the third U-phase neutral terminal portion 7UN3 is guided above the third W-phase coil 3W3. Similarly, a third V-phase neutral terminal portion 7VN3 of the third V-phase coil 3V3 is guided above the third V-phase coil 3V3 in FIG. 4. The third V-phase neutral terminal portion 7VN3 once extends in the radially inward direction, then, the third V-phase neutral terminal portion 7VN3 is guided above the third W-phase coil 3W3. A third W-phase neutral terminal portion 7WN3 of the third W-phase coil 3W3 is guided above the third W-phase coil 3W3 in FIG. 4. End portions of the respective third U-phase neutral terminal portion 7UN3, the third V-phase neutral terminal portion 7VN3 and the third W-phase neutral terminal portion 7WN3 are bundled by means of the third connecting member 4N3 and are press-fittingly joined.

A state where the outgoing wires are accommodated within the U-phase groove portion 86U, the V-phase groove portion 86V and the W-phase groove portion 86W, respectively, in FIG. 5. Additionally, illustrated in FIG. 5 is a cross-sectional diagram of the stator 1 taken along line V-V in FIG. 1A. More specifically, the V-phase groove portion 86V accommodates therein the third V-phase outgoing wire 7V3 of the third V-phase coil 3V3. The W-phase groove portion 86W accommodates therein the second W-phase outgoing wire 7W2 of the second W-phase coil 3W2 and the third W-phase outgoing wire 7W3 of the third W-phase coil 3W3. Furthermore, the U-phase groove portion 86U accommodates therein the second U-phase outgoing wire 7U2 of the second U-phase coil 3U2 and the third U-phase outgoing wire 7U3 of the third U-phase coil 3U3. Illustrated in FIG. 5 is an example of an accommodating state of the outgoing wires. A number of outgoing wires that each of the U-phase groove portion 86U, the V-phase groove portion 86V and the W-phase groove portion 86W may be changed in response to positions thereof in the circumferential direction.

According to the stator 1 of the rotary electrical machine of the first embodiment, the supply end of the conductive wire, which configures each of the first U-phase coil 3U1, the second U-phase coil 3U2, the third U-phase coil 3U3, the fourth U-phase coil 3U4, the fifth U-phase coil 3U5, the first V-phase coil 3V1, the second V-phase coil 3V2, the third V-phase coil 3V3, the fourth V-phase coil 3V4, the fifth V-phase coil 3V5, the first W-phase coil 3W1, the second W-phase coil 3W2, the third W-phase coil 3W3, the fourth W-phase coil 3W4 and the fifth W-phase coil 3W5, is formed to be longer by the predetermined length in order to form each of the first U-phase outgoing wire 7U1, the second U-phase outgoing wire 7U2, the third U-phase outgoing wire 7U3, the fourth U-phase outgoing wire 7U4, the fifth U-phase outgoing wire 7U5, the first V-phase outgoing wire 7V1, the second V-phase outgoing wire 7V2, the third V-phase outgoing wire 7V3, the fourth V-phase outgoing wire 7V4, the fifth V-phase outgoing wire 7V5, the first W-phase outgoing wire 7W1, the second W-phase outgoing wire 7W2, the third W-phase outgoing wire 7W3, the fourth W-phase outgoing wire 7W4 and the fifth W-phase outgoing wire 7W5. The outgoing wires 7U2 to 7U5, 7V2 to 7V5 and 7W2 to 7W5 are accommodated within the corresponding phase groove portions 86U, 86V and 86W of each of the electric power supply isolating portions 8 (8U3, 8V3 and 8W3) and then are guided to the corresponding terminals 4U, 4V and 4W. Accordingly, a bus ring and a bus bar, which are relatively expensive and which are generally used in a known rotary electrical machine, do not need to be provided at the rotary electrical machine according to the first embodiment. Furthermore, the U-phase terminal 4U bundles five U-phase outgoing wires 7U1, 7U2, 7U3, 7U4 and 7U5 and press-fittingly joins the U-phase outgoing wires 7U1, 7U2, 7U3, 7U4 and 7U5. The V-phase terminal 4V bundles five V-phase outgoing wires 7V1, 7V2, 7V3, 7V4 and 7V5 and press-fittingly joins the U-phase outgoing wires 7V1, 7V2, 7V3, 7V4 and 7V5. Furthermore, the W-phase terminal 4W bundles five W-phase outgoing wires 7W1, 7W2, 7W3, 7W4 and 7W5 and press-fittingly joins the W-phase outgoing wires 7W1, 7W2, 7W3, 7W4 and 7W5. Accordingly, a number of joint is reduced from fifteen joints in the know rotary electrical machine to three joints in the first embodiment. Still further, the upper bobbin 51 of each insulating bobbin 5 is formed to extend in the axial direction so as to integrally form the electric power supply isolating portion 8 (the U-phase electric power supply isolating portion 8U3, the V-phase electric power supply isolating portion 8V3 and the W-phase electric power supply isolating portion 8W3). Therefore, a number of components used for the electric power supply portion 6 and costs for the components used for the electric power supply portion 6 may be greatly reduced. Moreover, an assembling operation may be simplified, which may further result in reducing hours relating to manufacturing of the rotary electrical machine.

The U-phase groove portion 86U, the V-phase groove portion 86V and the W-phase groove portion 86W are formed at each of the first and second groove forming base portions 85 and 84 so as to extend in parallel with each other while keeping the distance Dl between the U-phase groove portion 86U, the V-phase groove portion 86V and the W-phase groove portion 86W. Accordingly, the insulation distance and a creepage insulation distance between the different phase outgoing wires (i.e. the U-phase outgoing wires, the V-phase outgoing wires and the W-phase outgoing wires) are ensured. Furthermore, each of the U-phase electric power supply isolating portion 8U3, the V-phase electric power supply isolating portion 8V3 and the W-phase electric power supply isolating portion 8W3 includes the guiding groove portion 82 for guiding the corresponding outgoing wire in the radially outward direction, and the bore 88 and the groove 89 for bending (curving) the corresponding outgoing wire in the U-shape. Therefore, the insulation distance between the U-phase outgoing wires 7U1 to 7U5, the V-phase outgoing wires 7V1 to 7V5 and the VV-phase outgoing wires 7W1 to 7W5, respectively, between the U-phase outgoing wires 7U1 to 7U5 on the one hand and the V-phase coils 3V1 to 3V5 and the W-phase coils 3W1 to 3W5 on the other hand, between the V-phase outgoing wires 7V1 to 7V5 on the one hand and the U-phase coils 3U1 to 3U5 and the W-phase coils 3W1 to 3W5 on the other hand, and between the W-phase outgoing wires 7W1 to 7W5 on the one hand and the U-phase coils 3U1 to 3U5 and the V-phase coils 3V1 to 3V5 on the other hand, is ensured, which further result in ensuring an appropriate and proper electrical insulation performance of the stator 1 for the rotary electrical machine. Accordingly, a size of the electric power supply portion 6 in the axial direction may be reduced, which will further result in reducing a length of the stator 1 in the axial direction. Still further, because the guiding groove portion 82 is formed at each of the electric power supply isolating portions 8 (i.e. the U-phase electric power supply isolating portions 8U3, the V-phase electric power supply isolating portions 8V3 and the W-phase electric power supply isolating portions 8W3) and because the protruding portion 87 is formed at the groove entrance of each of the U-phase groove portion 86U, the V-phase groove portion 86V and the W-phase groove portion 86W, the outgoing wires 7U1 to 7U5, 7V1 to 7V5 and 7W1 to 7W5 may be easily wired (arranged), so that the hours relating to the manufacturing of the rotary electrical machine may be reduced.

Second Embodiment

Figure 9:
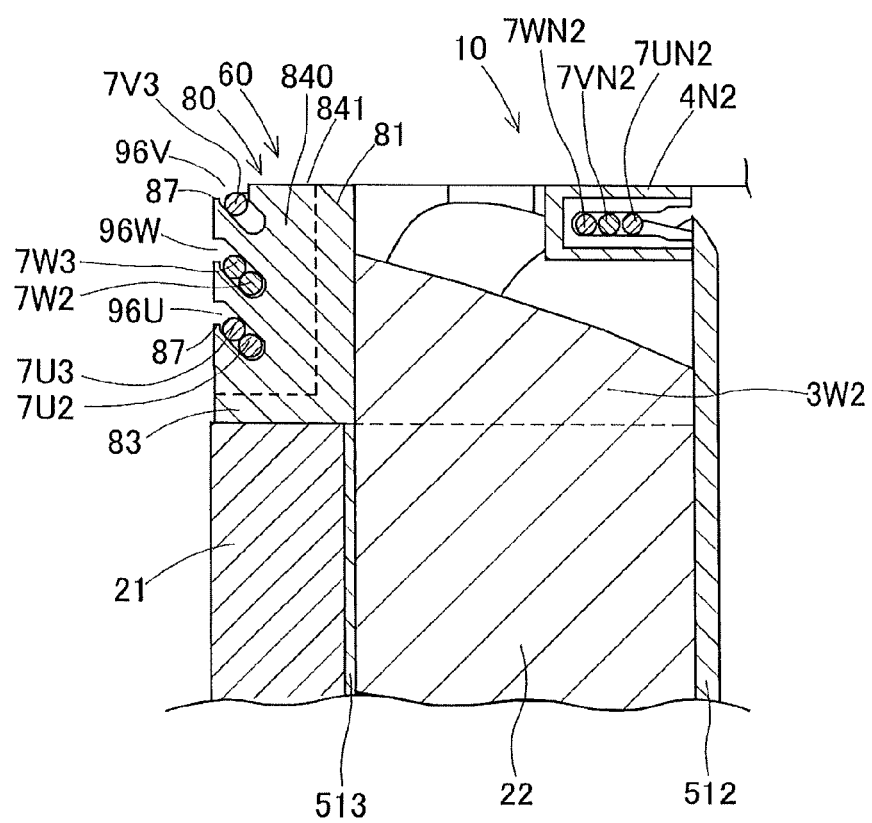
FIG. 9 is a cross-sectional diagram illustrating a stator of a rotary electrical machine according to a second embodiment.

A second embodiment of a stator 10 for a rotary electrical machine will be described below with reference to FIG. 9. The stator 10 for the rotary electrical machine according to the second embodiment differs from the stator 1 for the rotary electrical machine according to the first embodiment in that a grove portion, which is formed at an electric power supply isolating portion 80, is formed to have a different shape from the groove portions 86U, 86V and 86W formed at each of the electric power supply isolating portions 8. In the second embodiment, differences between the stator 1 of the rotary electrical machine according to the first embodiment and the stator 10 of the rotary electrical machine according to the second embodiment will be mainly described. Illustrated in FIG. 9 is a cross-sectional diagram of the stator 10 for the rotary electrical machine according to the second embodiment. A basic configuration of the stator 10 according to the second embodiment is substantially the same as the stator 1 explained above with reference to FIGS. 1 to 3. However, a shape of each of a U-phase groove portion 96U, a V-phase groove portion 96V and a W-phase groove portion 96W differs from a shape of each of the U-phase groove portion 86U, the V-phase groove portion 86V and the W-phase groove portion 86W according to the first embodiment. More specifically, as illustrated in FIG. 9, each of the U-phase groove portion 96U, the V-phase groove portion 96V and the W-phase groove portion 96W is formed so as to incline in a radially inward direction from a radially outward surface of a groove forming base portion 840 of each of the electric power supply isolating portions 80, which configure an electric power supply portion 60. The stator 10 of the rotary electrical machine according to the second embodiment is similar to the stator 1 of the rotary electrical machine according to the first embodiment in that the U-phase groove portion 96U, the V-phase groove portion 96V and the W-phase groove portion 96W are arranged so as to extend in parallel with each other while keeping a distance therebetween, each of the U-phase groove portion 96U, the V-phase groove portion 96V and the W-phase groove portion 96W is formed to have enough depth to accommodate therein two outgoing wires, the protruding portion 87 is formed at a groove entrance of each of the U-phase groove portion 96U, the V-phase groove portion 96V and the W-phase groove portion 96W, and the distance DI is ensured between the U-phase groove portion 96U, the V-phase groove portion 96V and the W-phase groove portion 96W (i.e. between three phases).

Additionally, the U-phase groove portion 96U, the V-phase groove portion 96V and the W-phase groove portion 96W may be formed at an axially outward surface 841 instead of the radially outward surface of the groove forming base portion 840 of each of the electric power supply isolating portions 80. In this case, the guiding groove portion 82 formed at the bobbin extending portion 81, the bore 88 and the groove 89 formed at the second groove forming base portion 52 may be changed to have any desired shape. A wiring process of the stator 10 of the rotary electrical machine according to the second embodiment is similar to the wiring process of the stator 1 of the rotary electrical machine according to the first embodiment. Therefore, according to the second embodiment, advantages and merits similar to the first embodiment may be achieved.

According to the first and second embodiments, plural electric power isolating portions 8 (the isolating members), each of which is integrally formed with the insulating bobbin 5, are arranged in the annular shape. However, the configuration of the electric power isolating portions 8 is not limited to the disclosures in the first and second embodiments. For example, the insulating bobbin 5 does not need to be integrally formed at the corresponding electric power isolating portion 8. Furthermore, the electric power isolating portion 8 may be formed as a single annular-shaped member, instead of providing plural electric power isolating portions 8 in the annular shape. Still further, according to the first and second embodiments, only the outgoing wires 7U1 to 7U5, 7V1 to 7V5 and 7W1 to 7W5 positioned closer to the supply ends of the corresponding coils are accommodated within the corresponding U-phase groove portions 86U, the V-phase groove portions 86V and the W-phase groove portions 86W. However, the stator (1, 10) of the rotary electrical machine according to the first and second embodiments may be modified so that neutral point grooves may be formed at the stator (1, 10), so that the outgoing wires positioned closer to the corresponding neutral point are accommodated within the corresponding neutral points. Still further, both supply ends of an outgoing wire of each of coils forming a delta connection (Δ connection) or both supply ends of an outgoing wire of a single phase coil may be accommodated within the groove portion(s). Moreover, the configuration of the stator (1, 10) of the rotary electrical machine may be adapted to an inner stator, which is arranged closer to an axis of a rotary electrical machine and which is configured so that magnetic pole teeth protrude in a radially outward direction of the rotary electrical machine. Various changes and modifications may be applied to the stator (1, 10) for the rotary electrical machine according to the first and second embodiments.

The stator (1, 10) for the rotary electrical machine includes the stator core 2 formed in the cylinder shape and having plural magnetic pole teeth 22, which are arranged in the circumferential direction of the stator (1, 10) while keeping the distance between the neighboring magnetic pole teeth 22 and each of which protrudes in the radial direction of the stator core 2, the coil 3 configured with the conductive wire wound around each of the magnetic pole teeth 22, the insulating bobbin 5 formed in the cylinder shape and provided between the coil 3 and the corresponding magnetic pole tooth 22, and the electric power supply portion (6, 60) arranged axially outwardly of the stator core 2, electrically connecting the coil 3 with the outside of the stator (1, 10), and including the outgoing wire (7U1, 7U2, 7U3, 7U4, 7U5, 7V1, 7V2, 7V3, 7V4, 7V5, 7W1, 7W2, 7W3, 7W4, 7W5), which corresponds to the portion of at least one of the winding start and the winding end of the conductive wire wound around the coil 3 being preliminarily extended by the predetermined length, and the electric power supply isolating member (8, 80), at which the groove portion (86U, 86V, 86W, 96U, 96V, 96W) for accommodating and guiding the corresponding outgoing wire (7U1, 7U2, 7U3, 7U4, 7U5, 7V1, 7V2, 7V3, 7V4, 7V5, 7W1, 7W2, 7W3, 7W4, 7W5) is formed.

Accordingly, the wiring of the outgoing wires (7U1 to 7U5, 7V1 to 7V5 and 7W1 to 7W5) allows the corresponding coils (3U1 to 3U5, 3V1 to 3V5 and 3W1 to 3W5) to be connected to the outside of the stator (1, 10) of the rotary electrical machine. Therefore, the bus ring, which is generally used at the known rotary electrical machine and which is relatively expensive, may be omitted from the stator (1, 10) of the rotary electrical machine according to the first and second embodiment. Accordingly, the number of components used for the electric power supply portion (6, 60) may be reduced, which may further result in greatly reducing the costs relating to the components for the electric power supply portion (6, 60).

According to the embodiments, the coils (3U1, 3U2, 3U3, 3U4, 3U5, 3V1, 3V2, 3V3, 3V4, 3V5, 3W1, 3W2, 3W3, 3W4, 3W5) are provided at the stator (1, 10) so as to form plural phases (U-phase, V-phase, W-phase), which are connected in parallel with each other, the groove portions (86U, 86V, 86W, 96U, 96V, 96W) are formed at the electric power supply isolating member (8, 80) so as to correspond to the number of the phases (U-phase, V-phase, W-phase) and each of the groove portions (86U, 86V, 86W, 96U, 96V, 96W) accommodates the corresponding outgoing wire (7U1, 7U2, 7U3, 7U4, 7U5, 7V1, 7V2, 7V3, 7V4, 7V5, 7W1, 7W2, 7W3, 7W4, 7W5) having the corresponding phase to the each of the groove portions (86U, 86V, 86W, 96U, 96V, 96W) in order to wire the outgoing wire (7U1, 7U2, 7U3, 7U4, 7U5, 7V1, 7V2, 7V3, 7V4, 7V5, 7W1, 7W2, 7W3, 7W4, 7W5).

Accordingly, the wiring of the outgoing wires (7U1 to 7U5, 7V1 to 7V5 and 7W1 to 7W5) allows the electric power to be supplied to each of the U-phase coils (3U1 to 3U5), the V-phase coils (3V1 to 3V5) and the W-phase coils (3W1 to 3W5) through the corresponding outgoing wires (7U1 to 7U5, 7V1 to 7V5, 7W1 to 7W5). Therefore, the expensive bus ring, which is generally used at the known rotary electrical machine and which is provided to each of plural phases, may be omitted from the stator (1, 10) of the rotary electrical machine according to the first and second embodiment. Accordingly, the number of components used for the electric power supply portion (6, 60) may be reduced, which may further result in greatly reducing the costs relating to the components for the electric power supply portion (6, 60).

According to the embodiments, the insulating bobbin 5 is formed to extend axially outwardly of the stator core 2, and each of the electric power supply isolating member (8, 80) is integrally formed with the corresponding insulating bobbin 5.

Accordingly, the electric power supply isolating members (8, 80), which are used for the stator (1, 10) of the rotary electrical machine according to the first and second embodiments instead of a holding member for holding the bus ring, do not need to be provided as a separate and independent component. Therefore, the number of components used for the stator (1, 10) of the rotary electrical machine and the costs of the components used for the stator (1, 10) of the rotary electrical machine may be greatly reduced. As a result, the assembling operation may be simplified, which may further result in reducing the hours relating to the manufacturing of the stator (1, 10) of the rotary electrical machine.

The electric power supply isolating members (8U3, 8V3, 8W3) are arranged axially outwardly of the stator core 2 so as to form the annular shape, and each of the electric power supply isolating members (8U3, 8V3, 8W3) includes plural groove portions (86U, 86V, 86W, 96U, 96V, 96W) at one of the radially outer surface and the axially outer surface of the each of the electric power supply isolating members (8U3, 8V3, 8W3) so as to extend in parallel with each other while keeping the distance between the neighboring groove portions (86U, 86V, 86W, 96U, 96V, 96W).

Accordingly, the U-phase groove portion (86U, 96U), the V-phase groove portion (86V, 96V) and the W-phase groove portion (86W, 96W), which are arranged so as to extend in parallel with each other, ensure the insulation distance and the creepage insulation distance between the U-phase outgoing wires (7U1 to 7U5), the V-phase outgoing wires (V1 to 7V5) and the W-phase outgoing wires (7W1 to 7W5). Accordingly, the appropriate and proper electrical insulation performance of the stator (1, 10) of the rotary electrical machine may be ensured. Furthermore, the size of the electric power supply portion (6, 60) in the axial direction may be reduced, which may further result in reducing the length of the stator (1, 10) in the axial direction.

According to the embodiments, at least one of the electric power supply isolating members (8U3, 8V3, 8W3) includes the guiding groove portion 82, which is formed so as to incline relative to the line extending in the radial direction of the stator core 2 and which is used to guide the outgoing wire (7U1, 7U2, 7U3, 7U4, 7U5, 7V1, 7V2, 7V3, 7V4, 7V5, 7W1, 7W2, 7W3, 7W4, 7W5).

According to the modified example of the first embodiment, at least one of the electric power supply isolating members (8U3, 8V3, 8W3) includes the guiding bore 100, which is formed so as to extend in the axial direction of the stator core 2 and which is formed so as to allow the outgoing wire (7U1, 7U2, 7U3, 7U4, 7U5, 7V1, 7V2, 7V3, 7V4, 7V5, 7W1, 7W2, 7W3, 7W4, 7W5) to pass therethrough.

According to the modified example of the first embodiment, the electric power supply isolating members (8U3, 8V3, 8W3) are arranged so that the clearance 200 is formed between the neighboring electric power supply isolating members (8U3, 8V3, 8W3) in the circumferential direction of the stator core 2, so that the outgoing wire (7U1, 7U2, 7U3, 7U4, 7U5, 7V1, 7V2, 7V3, 7V4, 7V5, 7W1, 7W2, 7W3, 7W4, 7W5) is guided through the corresponding clearance.

Accordingly, the insulation distance may be ensured between the outgoing wire and the neighboring outgoing wire of different phase or the coil of different phase until the outgoing wires (7U1 to 7U5, 7V1 to 7V5, 7W1 to 7W5) reach the corresponding groove portions (86U, 86V, 86W, 96U, 96V, 96W). Furthermore, the wiring of the outgoing wires (7U1 to 7U5, 7V1 to 7V5, 7W1 to 7W5) may be facilitated, which may further result in the hours relating to the manufacturing of the stator (1, 10) of the rotary electrical machine.

According to the embodiments, the protruding portion (87) is formed at the opening portion of the groove portion (86U, 86V, 86W, 96U, 96V, 96W), so that the size of the opening portion in the axial direction of the stator core 2 becomes smaller than the size of other portions of the groove portion (86U, 86V, 86W, 96U, 96V, 96W) in the axial direction.

Accordingly, the outgoing wire (7U1 to 7U5, 7V1 to 7V5, 7W1 to 7W5) is surely accommodated with the corresponding groove portion (86U, 86V, 86W, 96U, 96V, 96W). Therefore, operation reliability may be increased. Furthermore, once the outgoing wire (7U1 to 7U5, 7V1 to 7V5, 7W1 to 7W5) is accommodated within the corresponding groove portion (86U, 86V, 86W, 96U, 96V, 96W), the outgoing wire (7U1 to 7U5, 7V1 to 7V5, 7W1 to 7W5) is less likely to easily disengage from the corresponding groove portion (86U, 86V, 86W, 96U, 96V, 96W). Therefore, the wiring operation may be facilitated, which may further result in reducing the hours relating to the manufacturing of the stator (1, 10) of the rotary electrical machine.

According to the embodiments, the stator (1, 10) of the rotary electrical machine further includes the terminals (4U, 4V, 4W: the U-phase terminal 4U, the V-phase terminal 4V, the W-phase terminal 4W) for bundling and joining end portions of the respective outgoing wires (7U1, 7U2, 7U3, 7U4, 7U5, 7V1, 7V2, 7V3, 7V4, 7V5, 7W1, 7W2, 7W3, 7W4, 7W5) of each phase in order to allow the outgoing wires (7U1, 7U2, 7U3, 7U4, 7U5, 7V1, 7V2, 7V3, 7V4, 7V5, 7W1, 7W2, 7W3, 7W4, 7W5) to be connected to the outside of the stator (1, 10).

Accordingly, not only the bus ring, but also the bus bar, which is also used in the known rotary electrical machine, may be omitted. As a result, the number of components used for the electric power supply portion (6, 60) may be reduced, which may further result in greatly reducing the costs relating to the components for the electric power supply portion (6, 60). Furthermore, generally, a joining operation is applied to each end portion of each coil. However, according to the first and second embodiments, the joining operation is applied to each phase and not each end portion of each coil. Therefore, the number of joints is reduced, which results in reducing the hours relating to the manufacturing of the stator (1, 10) of the rotary electric machine.

According to the embodiments, the insulating bobbin 5 includes the groove forming base portion (84, 85) so as to extend from the end portion of the insulating bobbin 5 in the direction orthogonal to the axial direction of the stator core 2 wherein the bore 88 is formed at the groove forming base portion (84, 85) in order to allow the outgoing wire (7U1, 7U2, 7U3, 7U4, 7U5, 7V1, 7V2, 7V3, 7V4, 7V5, 7W1, 7W2, 7W3, 7W4, 7W5), which is wired in the circumferential direction of the stator core 2, to pass through the bore 88 and to curve.

According to the embodiments, the insulating bobbin 5 includes the groove forming base portion (84, 85) so as to extend from an end portion of the insulating bobbin 5 in the direction orthogonal to the axial direction of the stator core 2 wherein the groove (89) is formed so that the portion thereof opens at the portion between the groove forming base portion (84, 85) and the insulating bobbin 5.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stator for a rotary electrical machine, comprising:
a stator core formed in a cylinder shape and having a plurality of magnetic pole teeth, which are arranged in a circumferential direction of the stator while keeping a distance between the neighboring magnetic pole teeth and each of which protrudes in a radial direction of the stator core;
a coil configured with a conductive wire wound around each of the magnetic pole teeth;
an insulating bobbin formed in a cylinder shape and provided between the coil and the corresponding magnetic pole tooth, the insulating bobbin including circumferentially offset first and second axially extending portions, the first axially extending portion possessing a curved end surface, and the second axially extending portion possessing an end surface inclined relative to the radial direction of the stator core;
an electric power supply portion arranged axially outwardly of the stator core, electrically connecting the coil with an outside of the stator, and including an outgoing wire, which corresponds to a portion of at least one of a winding start and a winding end of the conductive wire wound around the coil being preliminarily extended by a predetermined length, and an isolating member, at which a groove portion for accommodating and guiding the corresponding outgoing wire is formed; and
a portion of the outgoing wire being positioned between the first and second axially extending portions of the insulating bobbin so that the portion of the outgoing wire is bordered on opposite sides by the curved end surface of the first axially extending portion of the insulating bobbin and the inclined end surface of the second axially extending portion of the insulating bobbin.

2. The stator for the rotary electrical machine according to claim 1, wherein a plurality of the coils are provided at the stator so as to form a plurality of phases, which are connected in parallel with each other, a plurality of the groove portions are formed at the isolating member so as to correspond to a number of the plurality of the phases and each of the plurality of the groove portions accommodates the corresponding outgoing wire having the corresponding phase to the each of the plurality of the groove portions in order to wire the outgoing wire.

3. The stator for the rotary electrical machine according to claim 2, wherein the insulating bobbin is formed to extend axially outwardly of the stator core, and each of the isolating members is integrally formed with the corresponding insulating bobbin.

4. The stator for the rotary electrical machine according to claim 2 further including a terminal for bundling and joining end portions of the respective outgoing wires of each phase in order to allow the outgoing wires to be connected to the outside of the stator.

5. The stator for the rotary electrical machine according to claim 1, wherein the insulating bobbin is formed to extend axially outwardly of the stator core, and the isolating member is integrally formed with the insulating bobbin.

6. The stator for the rotary electrical machine according to claim 1, wherein the plurality of the isolating members are arranged axially outwardly of the stator core so as to form an annular shape, and each of the isolating members includes a plurality of the groove portions at one of a radially outer surface and an axially outer surface of the each of the isolating members so as to extend in parallel with each other while keeping a distance between the neighboring groove portions.

7. The stator for the rotary electrical machine according to claim 6, wherein at least one of the plurality of the isolating members includes a guiding groove portion, which is formed so as to incline relative to a line extending in the radial direction of the stator core and which is used to guide the outgoing wire.

8. The stator for the rotary electrical machine according to claim 6, wherein at least one of the plurality of the isolating members includes a guiding bore, which is formed so as to extend in an axial direction of the stator core and which is formed so as to allow the outgoing wire to pass therethrough.

9. The stator for the rotary electrical machine according to claim 6, wherein the plurality of the isolating members are arranged so that a clearance is formed between the neighboring isolating members in a circumferential direction of the stator core, so that the outgoing wire is guided through the corresponding clearance.

10. The stator for the rotary electrical machine according to claim 1, wherein a protruding portion is formed at an opening portion of the groove portion, so that a size of the opening portion in an axial direction of the stator core becomes smaller than a size of other portions of the groove portion in the axial direction.

11. The stator for the rotary electrical machine according to claim 1, wherein the insulating bobbin includes a groove forming base portion so as to extend from an end portion of the insulating bobbin in a direction orthogonal to an axial direction of the stator core and wherein a bore is formed at the groove forming base portion in order to allow the outgoing wire, which is wired in a circumferential direction of the stator core, to pass through the bore and to curve.

12. The stator for the rotary electrical machine according to claim 1, wherein the insulating bobbin includes a groove forming base portion so as to extend from an end portion of the insulating bobbin in a direction orthogonal to an axial direction of the stator core and wherein a groove is formed so that a portion thereof opens at a portion between the groove forming base portion and the insulating bobbin.

13. The stator for the rotary electrical machine according to claim 1, wherein the inclined end surface of the second axially extending portion of the insulating bobbin faces radially outwardly.

14. The stator for the rotary electrical machine according to claim 1, wherein a first portion of the outgoing wire and a second portion of the outgoing wire extend in opposite circumferential directions, the first portion of the outgoing wire being positioned radially inward of the second portion of the outgoing wire.

15. The stator for the rotary electrical machine according to claim 14, wherein the first portion of the outgoing wire contacts the inclined end surface of the second axially extending portion of the insulating bobbin.

* * * * *